United States Patent
Kojima

(10) Patent No.: US 11,674,845 B2
(45) Date of Patent: Jun. 13, 2023

(54) ANGLE ADJUSTMENT MECHANISM AND FOURIER TRANSFORM INFRARED SPECTROPHOTOMETER EQUIPPED WITH THE SAME

(71) Applicant: Shimadzu Corporation, Kyoto (JP)

(72) Inventor: Seiji Kojima, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 0 days.

(21) Appl. No.: 16/906,719

(22) Filed: Jun. 19, 2020

(65) Prior Publication Data

US 2021/0072078 A1   Mar. 11, 2021

(30) Foreign Application Priority Data

Sep. 10, 2019   (JP) .................................. 2019-003417

(51) Int. Cl.
*G01J 3/02*   (2006.01)
*G01J 3/453*   (2006.01)

(52) U.S. Cl.
CPC ............. *G01J 3/0291* (2013.01); *G01J 3/021* (2013.01); *G01J 3/453* (2013.01)

(58) Field of Classification Search
CPC .......... G01J 3/0291; G01J 3/021; G01J 3/453; G01J 3/0286; G01J 3/4535; G01J 3/0237; G01J 3/4532; G01J 3/0205; G01J 3/45; G01N 21/01; G01N 21/35
See application file for complete search history.

(56) References Cited

U.S. PATENT DOCUMENTS

| | | | | |
|---|---|---|---|---|
| 4,023,891 A | * | 5/1977 | Chadwick | G02B 7/1821 359/874 |
| 4,060,314 A | * | 11/1977 | Heinz | G02B 7/1821 248/487 |
| 4,060,315 A | * | 11/1977 | Heinz | F16C 11/12 359/876 |
| 4,991,815 A | * | 2/1991 | Softness | G02B 7/1824 248/278.1 |

(Continued)

FOREIGN PATENT DOCUMENTS

| | | | |
|---|---|---|---|
| JP | 2011095458 A | * | 5/2011 |
| JP | 2019-095344 A | | 6/2019 |

OTHER PUBLICATIONS

Office Action dated Apr. 10, 2023 for corresponding Chinese Patent Application No. CN202010624853.8.

*Primary Examiner* — Marcus H Taningco
(74) *Attorney, Agent, or Firm* — Muir Patent Law, PLLC

(57) ABSTRACT

A typical configuration of the angle adjustment mechanism according to the present invention is provided with a parabolic mirror, a housing accommodating a parabolic mirror, a screw including a head arranged outside the housing and a shaft engaged with the parabolic mirror through a hole formed in the housing, and a base portion in contact with both the housing and the parabolic mirror. A force is applied to an engaging portion of the parabolic mirror in a direction approaching the housing and a force is applied to a portion of the parabolic mirror in contact with the base portion in a direction away from the housing. The angle of the parabolic mirror with respect to the housing changes in accordance with the change in the length of a portion where the shaft and the parabolic mirror engage.

5 Claims, 3 Drawing Sheets

(56) References Cited

U.S. PATENT DOCUMENTS

| | | | | |
|---|---|---|---|---|
| 6,486,474 B1* | 11/2002 | Owen | ............... | G01N 21/031 |
| | | | | 250/339.02 |
| 6,611,318 B2* | 8/2003 | LaPolice | ............... | G01S 7/4816 |
| | | | | 356/3.03 |
| 7,264,387 B1* | 9/2007 | McCarter | ............... | F21S 43/31 |
| | | | | 362/538 |
| 2003/0107782 A1* | 6/2003 | Aoki | ............... | H04N 1/1013 |
| | | | | 358/509 |
| 2008/0013055 A1* | 1/2008 | Matsuura | ............... | G03B 21/53 |
| | | | | 353/99 |
| 2008/0228083 A1* | 9/2008 | Wu | ............... | A61B 5/0059 |
| | | | | 600/475 |
| 2010/0243902 A1* | 9/2010 | Wada | ............... | G01N 21/35 |
| | | | | 250/339.08 |
| 2016/0084709 A1* | 3/2016 | Day | ............... | G01N 21/718 |
| | | | | 356/318 |
| 2017/0299517 A1* | 10/2017 | Hegazi | ............... | G01N 21/255 |
| 2018/0172580 A1* | 6/2018 | Bjoroy | ............... | G01N 21/39 |
| 2019/0162593 A1 | 5/2019 | Kamikake | | |

\* cited by examiner

ANGLE ADJUSTMENT MECHANISM AND FOURIER TRANSFORM INFRARED SPECTROPHOTOMETER EQUIPPED WITH THE SAME

CROSS-REFERENCE TO RELATED APPLICATIONS

This application claims priority under 35 U.S.C. § 119 to Japanese Utility Model Application No. 2019-003417 filed on Sep. 10, 2019, the entire disclosure of which is incorporated herein by reference in its entirety.

TECHNICAL FIELD

The present invention relates to a mechanism for adjusting an angle of a parabolic mirror accommodated in a housing and a Fourier transform infrared spectrometer equipped with the same.

BACKGROUND OF THE INVENTION

Some analysis devices for performing an optical measurement are provided with a housing in which an optical system is accommodated (see, e.g., Patent Document 1). When such an analyzer is shipped from a factory or when a user starts a measurement using such an analyzer, the position and/or the angle of the optical system accommodated in a housing need to be finely adjusted to converge light to a desired position. In particular, it is required to converge collimated light to the desired position by adjusting the angle of the parabolic mirror.

PRIOR ART DOCUMENT

Patent Document

Patent Document 1: Japanese Unexamined Patent Application Publication No. 2019-95344

SUMMARY OF THE INVENTION

Problems to be Solved by the Invention

However, in the analyzer disclosed in the above-described Patent Document 1, since the parabolic mirror is screwed to the wall surface of the housing and is provided with no angle adjustment mechanism, fine adjustments cannot be made when the user starts a measurement. Further, in cases where screwing is performed such that the head of the screw is arranged inside the housing, the housing needs to be opened to make the angle adjustment, causing complicated works.

The present invention was made to solve the above-mentioned problems, and an object of the present invention is to provide an angle adjustment mechanism capable of adjusting an inclination of a parabolic mirror accommodated in a housing without opening the housing.

Means for Solving the Problem

A typical configuration of an angle adjustment mechanism according to the present invention for achieving the above-described object is provided with a parabolic mirror, a housing in which the parabolic mirror is accommodated, a screw provided with a head arranged outside the housing and a shaft engaged with an engaging portion of the parabolic mirror through a hole formed in the housing, and a base portion which is in contact with both the housing and the parabolic mirror. A force is applied to the engaging portion of the parabolic mirror in a direction approaching the housing and a force is applied to a portion of the parabolic mirror in contact with the base portion in a direction away from the housing, and an angle of the parabolic mirror with respect to the housing changes in accordance with a change in a length of a portion where the shaft and the parabolic mirror engage.

Effects of the Invention

According to the above-described configuration, the inclination of the parabolic mirror can be adjusted without opening the housing. Further, after the angular adjustment, the parabolic mirror is fixed with respect to the housing.

EMBODIMENTS FOR CARRYING OUT THE INVENTION

Embodiment 1

An embodiment of an angle adjustment mechanism according to the present invention will be described in detail with reference to the attached drawings.

Figure 1:
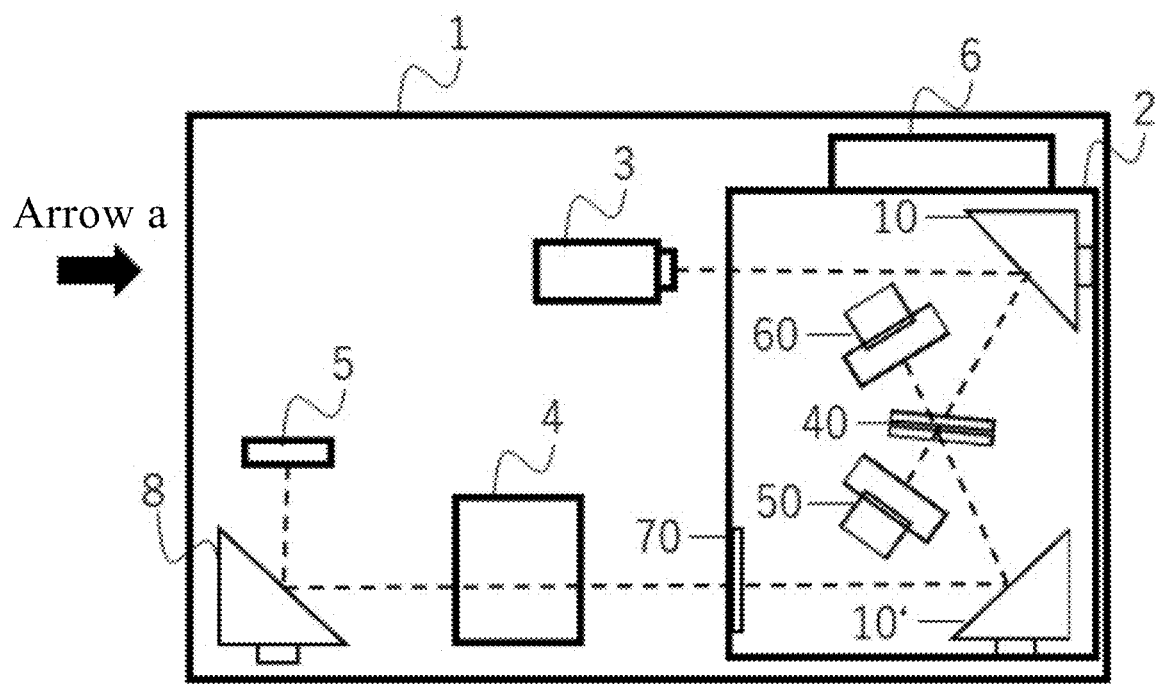
FIG. 1 is a plan view schematically showing the configuration of a Fourier transform infrared spectrophotometer.

FIG. 1 is a plan view showing a configuration of a Fourier transform infrared spectrophotometer 1. The Fourier transform infrared spectrophotometer 1 is provided with a housing 2 in which an optical interferometer is accommodated, a light source 3, a sample table 4, a detector 5, and a dehumidification mechanism 6. A sample set on the sample table 4 is irradiated with the infrared light from the light source 3, and the light from the sample is detected by the detector 5, so the sample can be analyzed.

The housing 2 accommodates optical components configuring a Michelson interferometer, such as, e.g., a parabolic mirror 10, a movable mirror 50, a fixed mirror 60, and a beam splitter 40. The infrared light emitted from the light source 3 enters the parabolic mirror 10 accommodated in the housing 2. The light is collimated by the parabolic mirror 10 and enters the beam splitter 40. The collimated light is formed into interference light using the movable mirror 50, the fixed mirror 60, and the beam splitter 40. The interfered collimated light is converged by the parabolic mirror 10' at a position directly above the sample table 4. At this time, the converged light transmits an infrared transmission window 70 provided between the parabolic mirror 10' and the sample table 4. Thereafter, the light passed directly above the sample table 4 is converged by the converging mirror 8 and enters the detector 5.

The dashed line in FIG. 1 represents the optical axis.

The beam splitter 40 is made of, for example, potassium bromide (KBr). Potassium bromide has advantages of being inexpensive and having high infrared light transmittance, but has characteristics of being highly deliquescent and easily deliquescent depending on the humidity of the surrounding environment. Therefore, a hygroscopic agent, such as, e.g., silica gel, is accommodated in the dehumidification mechanism 6 communicating with the housing 2 so that the beam splitter 40 can be used in a low-humidity environment.

Figure 2A:
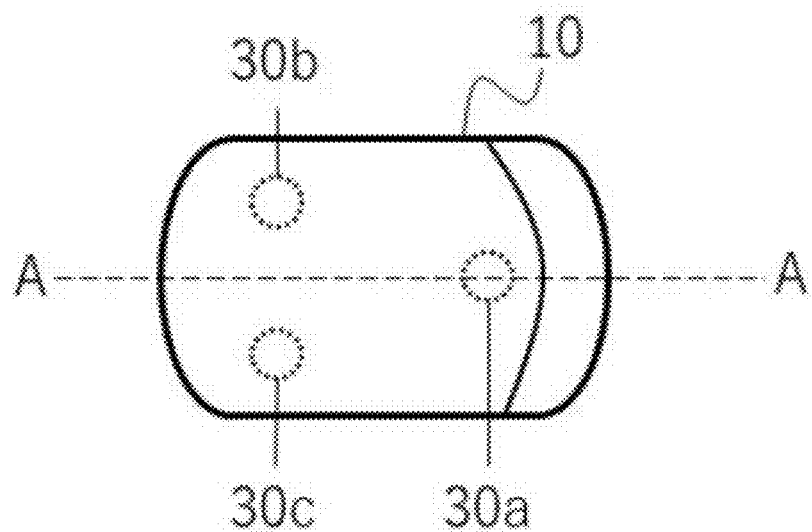
FIG. 2A is a plan view showing a first embodiment of the angle adjustment mechanism according to the present invention.
Figure 2B:
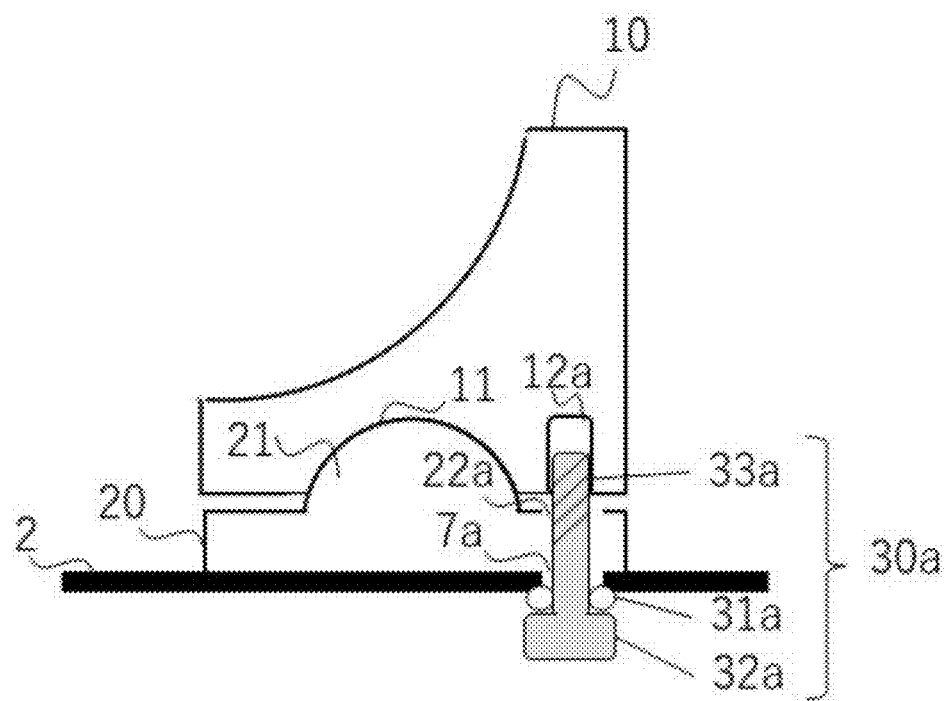
FIG. 2B is a cross-sectional view taken along the line A-A showing the first embodiment of the angle adjustment mechanism according to the present invention.

FIGS. 2A and 2B are diagrams showing a first embodiment of an angle adjustment mechanism according to the present invention. FIG. 2A shows the parabolic mirror 10 fixed to the housing 2 as viewed from the arrow "a" in FIG. 1. The parabolic mirror 10 is fixed to the housing 2 by means of three pieces of screws 30 (30a, 30b, 30c).

FIG. 2B is a cross-sectional view taken along the line A-A in FIG. 2A. A spherical concave portion 11 is provided at the center of the parabolic mirror 10 and a spherical convex portion 21 is provided at the center of the base portion 20. The concave portion and the convex portions are configured to be in slide-contact with each other. A gap of about 1 mm is provided between the parabolic mirror 10 and the base portion 20 except for the spherical portions 11 and 21 thereof. That is, the parabolic mirror 10 and the base portion 20 are in contact with each other only at the spherical concave portion 11 and the spherical convex portion 21.

The screw 30 (30a, 30b, 30c) is provided with a head 32 (32a, 32b, 32c) and a shaft 33 (33a, 33b, 33c).

The head 32a of the screw 30a is arranged outside the housing 2. The shaft 33a of the screw 30a is engaged with the engaging portion 12a formed in the parabolic mirror 10 through a housing hole 7a formed in the housing 2 and a base portion hole 22a formed in the base portion 20. The engaging portion 12a is provided with a female thread and is configured to be engaged with the shaft 33a of the screw 30a. The diameter of the housing hole 7a and that of the base portion hole 22a are larger than the diameter of the shaft 33a.

Although the relation between the screw 30a, the housing 2, the base portion 20, and the parabolic mirror 10 has been described as an example, the relation between the screw 30b, the screw 30c, the housing 2, the base portion 20, and the parabolic mirror 10 is quite the same.

An O-ring 31 (31a, 31b, 31c) is arranged between the head 32 (32a, 32b, 32c) of the screw 30 (30a, 30b, 30c) and the outer wall surface of the housing 2. Since the diameter of the housing hole 7 and that of the base portion hole 22 are larger than the diameter of the shaft 33, a gap exists between the housing hole 7 and the base portion hole 22 and the shaft 33. The O-ring 31 prevents the outside air from flowing into the housing 2 through the gap and lowering the airtightness of the housing interior. That is, the low-humidity environment inside the housing is prevented from being adversely affected. In order to reduce the number of components, it is desirable to use a sealing screw as the screw 30 30a, 30b, 30c.

A user using the Fourier transform infrared spectrophotometer 1 can adjust the angle of the parabolic mirror 10 with respect to the housing 2 by rotating the head 32 (32a, 32b, 32c) arranged outside the housing 2. A stress A is applied to the engaging portion 12 of the parabolic mirror 10 in a direction approaching the housing 2 (in the downward direction in the drawing) by the screw 30. A stress B is applied to the part of the spherical concave portion 11 of the parabolic mirror 10 in contact with the spherical convex portion 21 in a direction away from the housing 2 (in the upward direction in the drawing) by the spherical convex portion of the base portion 20. The stress A and the stress B have a relation satisfying the law of action and reaction.

For example, in cases where it is desired to tilt the parabolic mirror 10 forward, the head 32a is rotated in the loosening direction and the heads 32b and 32c are rotated in the tightening direction. As a result, the length of the engaging portion of the shaft 33a and the engaging portion 12a of the parabolic mirror 10 decreases, and the length of the engaging portion of the shaft 33b and 33c and the engaging portion 12b and 12c increases. Varying the lengths of the engaging portions changes the angle of the parabolic mirror 10 with respect to the housing 2. By adjusting the angle of the parabolic mirror 10 in this manner, the infrared light can be converged at a desired position, i.e., a position where the sample is arranged.

Applying the angle adjustment mechanism of the present invention to the optical system of the Fourier transform infrared spectrophotometer allows the angle of the parabolic mirror to be adjusted in a state in which a certain degree of humidity is maintained in the housing accommodating the optical system. Accordingly, it is possible to prevent the deliquescent optical component, such as, e.g., a beam splitter, from being deteriorated due to the humidity.

So far, the angle adjustment mechanism has been described in which the parabolic mirror has a spherical concave portion and the base portion has a spherical convex portion, and the parabolic mirror and the base portion are in contact with each other only at the spherical concave portion and the spherical convex portion. In such a configuration, the angle can be adjusted with less force. In addition, the angle adjustment mechanism in which three pieces of screws are provided for one piece of the parabolic mirror 1 has been described so far. In the case of such a configuration, it is possible to finely adjust the angle more precisely.

Embodiment 2

Figure 3:
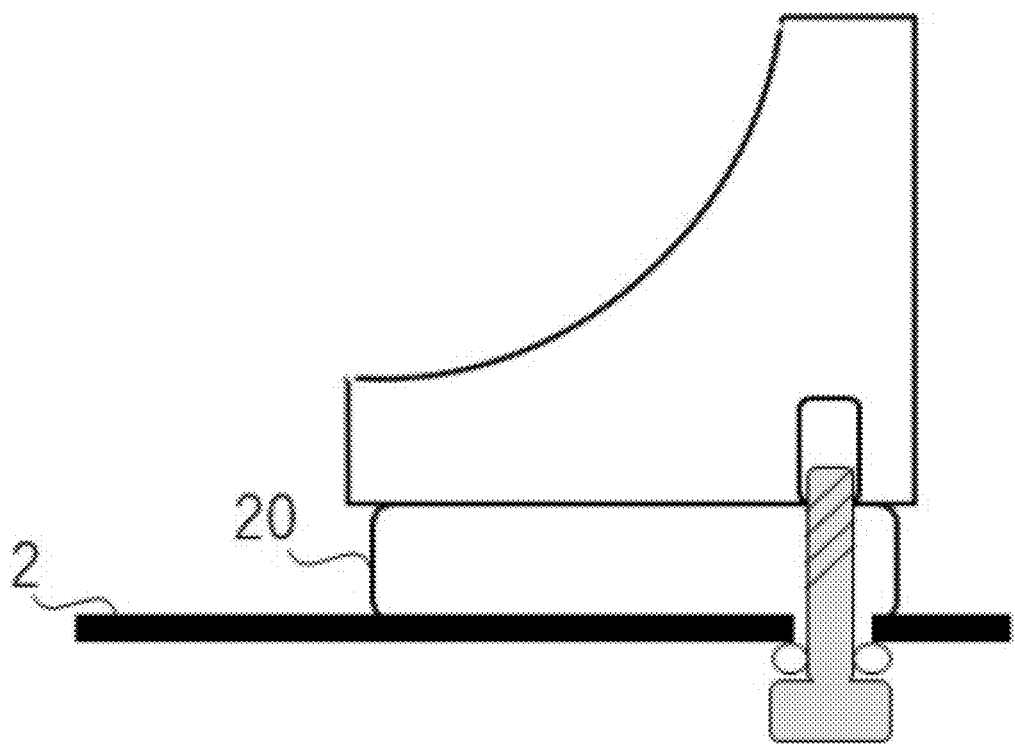
FIG. 3 is a cross-sectional view showing a modification of the angle adjustment mechanism according to the present invention.

As an alternative example, the base portion may be configured by a resilient elastic member. FIG. 3 shows an A-A cross-sectional view in this case. With such a configuration, the problems of the present invention can be solved with a simpler configuration. The elastic member is, for example, a coiled spring. Similar to Embodiment 1, it is desirable that at least three pieces of screws be provided for one piece of the parabolic mirror 1.

The term "contact" recited in claims of the present invention includes the meaning of physical integration of the housing, the base portion, and the parabolic mirror.

The invention claimed is:
1. An angle adjustment mechanism comprising:
   a parabolic mirror;
   a housing in which the parabolic mirror is accommodated;
   a base portion which is in contact with both the housing and the parabolic mirror,
   a screw provided with a head arranged outside the housing and a shaft engaged with an engaging portion of the parabolic mirror through a hole formed in the housing and a base portion hole formed in the base portion; and
   wherein a force is applied to the engaging portion of the parabolic mirror in a direction approaching the housing and a force is applied to a portion of the parabolic mirror in contact with the base portion in a direction away from the housing, and an angle of the parabolic mirror with respect to the housing changes in accordance with a change in a length of a portion where the shaft and the parabolic mirror engage,
   wherein the engaging portion is formed within the parabolic mirror and includes a threaded portion, wherein the parabolic mirror includes a spherical concave portion, wherein the base portion includes a spherical convex portion, and wherein the parabolic mirror and the base portion are in contact with each other only at the spherical concave portion and the spherical convex portion.

2. A Fourier transform infrared spectrophotometer equipped with the angle adjustment mechanism as recited in claim 1, wherein the housing accommodates an optical interference system configuring a Fourier transform infrared spectrophotometer and a dehumidification mechanism for dehumidifying an inside of the housing, and wherein the optical interference system includes the parabolic mirror and a beam splitter made of potassium bromide.

3. The Fourier transform infrared spectrophotometer as recited in claim 2, wherein an O-ring is arranged between the housing and the head of the screw.

4. The angle adjustment mechanism as recited in claim 1, wherein at least three or more screws are provided for one piece of the parabolic mirror.

5. The angle adjustment mechanism as recited in claim 1, wherein the base portion is an elastic member.

\* \* \* \* \*